United States Patent Office 3,147,227
Patented Sept. 1, 1964

3,147,227
PROCESS FOR THE MANUFACTURE OF ALUMI-
NUM HYDROXY-PHOSPHATE XEROGELS
Rowland C. Hansford, Fullerton, Calif., assignor to Union
Oil Company of California, Los Angeles, Calif., a cor-
poration of California
No Drawing. Filed Jan. 9, 1961, Ser. No. 81,232
4 Claims. (Cl. 252—317)

This invention relates to methods for the manufacture of high-surface-area aluminum hydroxy-phosphate xerogels, and to the novel resulting products. The essential process feature of the invention involves a gradual and homogeneous gelation of a hydrogel of aluminum hydroxy-phosphate by heating an acidic aqueous solution containing an aluminum salt, dissolved phosphate ions, and urea. Heating the solution effects the release of ammonia at a slow and controlled rate, and this in turn causes a gradual and homogeneous neutralization of excess acidity, such that all portions of the solution are at the same pH at any given time. When the critical pH of gelation is reached, the aluminum hydroxy-phosphate hydrogel begins to form homogeneously by ionic interactions sumarized as follows:

$$Al^{3+} + (1-x)PO_4^{3-} + 3x(OH^-) \rightarrow Al \cdot 3x(OH) \cdot 1-x(PO_4)$$

wherein $x$ is a number from about 0.1 to 0.98. The resulting hydrogels contain an $Al_2O_3$ equivalent of about 5–95% by weight and an $AlPO_4$ equivalent of about 5–95%, or expressed differently, a mole ratio of $PO_4/Al$ of about 0.02 to 0.9.

The corresponding xerogels are prepared by washing and/or heating the hydrogel to remove soluble and/or volatile salts, and calcining to reduce the water content to the desired level, e.g., below about 5%. This final water content (so-called) includes remaining hydroxyl groups which are believed to exist both as Al—OH groups and P—OH groups, each of which contributes desirable surface acidity to the composition. The final products are useful as cracking catalysts, polymerization catalysts, isomerization catalysts, alkylation catalysts, and the like, or they may be used as supports upon which other catalytic materials may be distended, as for example boron trifluoride and/or hydrogenating metals such as nickel or platinum.

In the usual methods for preparing inorganic hydrogels such as silica, alumina, and the like, a chemical precipitant is simply admixed directly with a solution of a salt or hydrosol corresponding to the desired gel. This technique results in non-homogeneous precipitation because the initial distribution of the precipitant in the aqueous medium is non-homogeneous, with the result that precipitation occurs under widely differing pH conditions throughout the body of liquid. Generally, there is a rapid syneresis of the gel initially formed, resulting finally in a gelatinous precipitate rather than a true homogeneous hydrogel. Where, as here, it is desired to obtain maximum surface area of aluminum phosphate xerogels, the usual non-homogeneous precipitation methods are inadequate. For example, if a phosphate salt solution is simply mixed with an aluminum salt solution, the resulting aluminum phosphate precipitate may actually be crystalline in nature, and has a very low surface area.

The process of this invention involves achieving a more gradual and homogeneous gelation of aluminum hydroxy-phosphate by the use of a delayed precipitant, urea which may be admixed homogeneously with the aluminum salt-phosphate ion solution without effecting precipitation, but which upon heating will release ammonia uniformly throughout the solution so that a true homogeneous hydrogel of aluminum-hydroxy-phosphate is formed, which normally does not undergo appreciable syneresis.

The term "aluminum hydroxy-phosphates," as used herein, is intended to refer to nominally basic aluminum phosphate salts, i.e., compositions which, though giving an acid reaction, contain an excess of aluminum hydroxide or hydrous alumina relative to the normal $AlPO_4$ salt. As indicated above, the final compositions contain excess $Al_2O_3$ equivalent, amounting to between about 5–95% by weight of the dry gel; preferably the excess is between about 10% and 75%, the remainder being calculated as $AlPO_4$.

Aluminum phosphate has previously been suggested as an acidic catalyst or catalyst support. However, as noted above, the usual methods for preparing this substance do not produce a high area and high acidity catalyst. It has recently been shown that an aluminum phosphate of fairly high surface area may be obtained by slow neutralization of a solution of aluminum chloride plus phosphoric acid with ammonia. However, as will be shown, this product is likewise inferior to the product of this invention. Another method has recently been suggested which involves the addition of liquid ethylene oxide to a concentrated solution of aluminum chloride plus phosphoric acid. This method does produce a product of high surface area, but is very expensive, since it requires the chemical consumption of ethylene oxide, which is converted in the process to ethylene chlorohydrin. Furthermore, it is rather inconvenient (strong cooling with slow addition of ethylene oxide is required). The process of this invention however is very simple and inexpensive, and produces a highly desirable product. Moreover, the new process is conducted in an entirely aqueous medium, both in the gelation step and in any required subsequent washing steps.

More in detail, the process of this invention involves first forming a homogeneous aqueous solution of sufficiently high acidity to maintain in solution the desired aluminum salt plus the desired, less-than-stoichiometric ratio of phosphate ions, plus the amount of urea required to yield sufficient ammonia to raise the final pH during heating to above the gelation point. The critical pH, below which the aluminum salt will remain in solution and above which gelation begins, is found to vary somewhat depending upon the ratio of aluminum salt to phosphate ions in the solution, and perhaps on other factors as well. In general however, it may be stated that gelation begins within the pH range of about 1.8 to 5.0, and will be substantially complete somewhere within the 2.0–6.0 pH range. In most cases, the critical pH of incipient gelation is between about 3.5 and 4.5, and it is preferred to carry the neutralization into the 5–8 pH range for complete gelation.

The phosphate ions may be added as phosphoric acid, or any compatible soluble salts thereof, e.g., ammonium phosphate. Normally it is preferable to adjust the pH of the initial solution by using phosphoric acid, but other compatible acids may be used, e.g., nitric or hydrochloric. The resulting solution is then heated at, e.g., 50°–200° C., to effect the release of ammonia, resulting in the formation of a true hydrogel of aluminum hydroxy-phosphate. The desired result is not achieved when equal mole-ratios of the aluminum salt and phosphate ion are present, for this results in a 100% $AlPO_4$ precipitate, which does not display the high surface area desired. It is therefore necessary to use less than a stoichiometric ratio of phosphate ion to aluminum salt, preferably between about 0.02 and 0.9 mole thereof per mole of aluminum salt.

According to a preferred embodiment of the invention which minimizes the consumption of urea in cases where phosphoric acid is used, the acid may be partially neutralized by adding ammonia or other soluble base, prior to the gelation step. This neutralization may be performed prior to admixture of the phosphoric acid with the aluminum salt solution, between the admixing and the addition of urea, or after the addition of urea. Generally, it is preferred to perform the preliminary neutralization after admixing the phosphoric acid with the aluminum salt solution, so that the point of incipient gelation may be readily observed. The aluminum salt remains in solution until the pH is raised to the point of incipient gelation, usually between about 3.5 and 4.5. Since the aluminum salts themselves are in general very acidic, it is often feasible, as where the ratio of aluminum salt to phosphoric acid is high, to neutralize or even over-neutralize the phosphoric acid, stoichiometrically, before gelation commences. With the solution at or somewhat below the pH of incipient gelation, only sufficient urea is needed to provide during heating sufficient ammonia to raise the pH to the desired level for complete gelation. Heating and gelation is then carried out as previously described.

In order to prepare the hydrogel for use as a catalyst, it is necessary to remove contaminating salts, and to dry the product. Soluble salts may be removed for example by leaching or macerating the hydrogel with distilled water, and continuing the washing until substantially all soluble salts are removed. Preferably, however, an aluminum salt is selected, the anion of which forms a volatile ammonium salt, e.g., ammonium nitrate or ammonium chloride. These salts may be removed simply by drying and calcining the gel at e.g., 400°–600° C. for 1 to 24 hours.

The following examples are cited to illustrate the invention more concretely, but are not to be construed as limiting in scope:

Example I

A solution was prepared by dissolving 522 grams of $Al(NO_3)_3 \cdot 9H_2O$ in 1,000 ml. distilled water. A second solution of ammonium phosphate was prepared by diluting 46 grams of 85% $H_3PO_4$ to 100 ml. with water and neutralizing with a solution of 82 ml. of 28% $NH_3$ diluted to 200 ml. This corresponds to complete neutralization of $H_3PO_4$ to give $(NH_4)_3PO_4$. The $(NH_4)_3PO_4$ solution (actually $(NH_4)_2HPO_4 + NH_3$) was added to the first solution with stirring. No precipitation occurred. A solution of 100 grams of urea in 200 ml. distilled water was then added, and the total solution was heated to 95° C. for 16 hours. No gelation occurred, but urea was still hydrolyzing as judged by continued evolution of $CO_2$. An additional 50 grams of urea was added, and after about 20 more hours the solution had set up to a slightly opalescent, firm hydrogel.

The hydrogel was dried at 110° C. for 2 days, after which it was calcined at 500° C. to decompose the entrained $NH_4NO_3$ and unreacted urea. The product was glassy like silica gel and had a surface area of 457 square meters per gram. It also had a very high degree of acidity, since it produced a bright yellow color when contacted with a benzene solution of p-nitrochlorobenzene. This very weakly basic indicator has a pKa value of −11.5. Thus, only extremely strong acids are capable of converting this indicator to its colored conjugate acid.

The nominal composition of the catalyst of this example is 50% $AlPO_4 \cdot 50\%$ $Al_2O_3$ by weight.

Example II

A catalyst of nominal composition of 75% $AlPO_4$ and 25% $Al_2O_3$ (by weight) was prepared as follows. A solution was made up to contain 828 grams of $Al(NO_3)_3 \cdot 9H_2O$ in 1,500 ml. of distilled water. Then 142 grams of 85% $H_3PO_4$ was added. The solution was titrated slowly with 5-normal $NH_4OH$ until precipitation just started. The partially neutralized solution was then divided into two equal parts, A and B.

Seventy grams of urea was added to part A, and the solution heated to 95° C. A clear true hydrogel was formed within 16 hours. The pH was slightly on the acid side at this time. The hydrogel was dried at 250° F. to form a glassy product, which was then calcined at 500° C. to remove $NH_4NO_3$. The surface area of the calcined product was 468 square meters per gram. It also produced a bright yellow color with p-nitrochlorobenzene, showing very high acidity. After standing in air for an hour it still turned the indicator yellow in spite of the water adsorbed from the atmosphere. It should be noted that a silica-alumina cracking catalyst will turn this indicator only immediately after calcination, and not after exposure to air for several minutes. The $AlPO_4 \cdot Al_2O_3$ gel must therefore be more acidic than $SiO_2 \cdot Al_2O_3$, either in strength or in number of acid centers, or both.

Example III

The second half of the partially neutralized solution from Example II (part B), was titrated slowly with 5 N $NH_4OH$ until complete precipitation had occurred. The gelatinous precipitate was filtered, dried, and calcined as in Example II. The surface area of the calcined product was 306 square meters per gram, or 162 square meters lower than that of the product of Example II. The freshly calcined product turned p-nitrochlorobenzene yellow, but after standing in air for only 10 minutes, no color change occurred with this indicator nor with p-nitrotoluene, which has a pKa value of −10.3. However, it did turn anthraquinone yellow (pKa=−8.2). This behavior is almost identical to that of a good silica-alumina catalyst.

Example IV

A catalyst of nominal composition of 90% $AlPO_4$, and 10% $Al_2O_3$ was prepared in a similar manner. A solution of 702 grams of $Al(NO_3)_3 \cdot 9H_2O$ in 1,500 ml. of distilled water was prepared. To this was added 170 grams of 85% $H_3PO_4$ and the whole titrated with 5 N $NH_4OH$ until incipient precipitation occurred (pH=2.0). The partially neutralized solution was divided into two equal parts, A and B.

Sixty grams of urea was dissolved in A and the solution heated at 95° C. overnight. A slightly opaque true hydrogel was formed, and the pH was slightly on the acid side as in Example II. The gel was treated as in the above examples. The surface area of the calcined product was 304 square meters per gram. The acidity of the freshly calcined product was high, turning p-nitrochlorobenzene yellow. However, after standing 1 hour in air, it barely turned anthraquinone yellow, showing a lower degree of acidity than the product of Example II.

Example V

The second half of the solution of Example IV (part B) was titrated with 5 N $NH_4OH$ until complete precipitation occurred. It had a surface area of 263 square meters per gram and, freshly calcined, turned p-nitrochlorobenzene very slightly yellow. After standing in air for only 10 minutes it barely turned anthraquinone yellow.

Example VI

A catalyst of nominal composition of 97.5% $AlPO_4$ and 2.5% $Al_2O_3$ (96.5% $AlPO_4$ by actual analysis) was prepared. A solution of 615 grams of $Al(NO_3)_3 \cdot 9H_2O$ in 1,500 ml. of distilled water was made up, and to this was added 185 grams of 85% $H_3PO_4$. The solution was titrated to incipient precipitation with 5 N $NH_4OH$. To one-half of this solution was then added 60 grams of urea, and the solution heated to 95° C. overnight. A true hydrogel was not formed, but rather a dense granular precipitate. After drying and calcination at 500° C., the product had a surface area of only 42 square meters per gram. The freshly calcined product would not change the color of p-nitrochlorobenzene, showing a lower order of acidity than that of all the previous catalysts. It barely turned p-nitrotoluene yellow.

The foregoing examples show that in order to obtain a true hydrogel, the composition must contain in excess of about 5% $Al_2O_3$. Compositions approaching stoichiometric $AlPO_4$ form low area, and probably crystalline, products. The acidity measurements with indicators demonstrate that the true hydrogel products are more acidic than the same compositions precipitated with ammonia. Moreover, urea-gelled compositions containing above about 10% $Al_2O_3$ appear to be more acidic than silica-alumina compositions containing the same amount of alumina.

The methods of producing $AlPO_4 \cdot Al_2O_3$ gels described in the above examples are only illustrative. Other aluminum salts may be used in place of the nitrate. A very convenient and cheap method for preparing the solution for hydrolytic gelation of $AlPO_4 \cdot Al_2O_3$ is to dissolve the requisite amount of alumina trihydrate (e.g., gibbsite) in hot $H_3PO_4$ to form a syrupy product which then is easily soluble in hydrochloric acid.

*Example VII*

Strong $H_3PO_4$ (115 grams of 85% $H_3PO_4$) was diluted with 115 ml. distilled water and brought to boiling. To this was added slowly 140 grams of commercial $Al(OH)_3$ (gibbsite). A viscous clear product resulted and this was then dissolved in 600 ml. of 6 N HCl with gentle heating for about 7 hours. The clear solution was then diluted to 2,500 ml. Only 25 ml. of 5 N $NH_4OH$ was required to start precipitation. Then 140 grams of urea was dissolved in the solution and the whole was heated at 95° C. for 22 hours when gelation started. The pH at this point was 4.3. After about 1½ hours the product was a firm hydrogel having a pH of 4.5. The hydrogel was washed with water to remove soluble salts, then dried and calcined to a high area xerogel.

The foregoing description of specific methods and materials for use in this invention is not intended to be limiting in scope except where indicated. Many variations will occur to those skilled in the art and all such variations which yield essentially the same results are intended to be included. The true scope of the invention is intended to be embraced by the following claims.

I claim:
1. A process for the manufacture of aluminum hydroxy-phosphate xerogels of high surface area and high acidity, which comprises forming an acidic water solution of (1) an aluminum salt selected from the class consisting of aluminum chloride and aluminum nitrate, (2) phosphoric acid in proportions sufficient to provide between about 0.02 and 0.9 mole of phosphate ion per mole of aluminum salt, and (3) urea; heating the resulting solution at a temperature sufficiently high to effect decomposition of said urea with resultant liberation of ammonia in amounts sufficient to raise the pH of said solution to above the gelation point, thereby precipitating an aluminum hydroxyphosphate hydrogel, treating said hydrogel to remove contaminating salt, and drying the same to form a xerogel.

2. A process as defined in claim 1 wherein said aqueous solution contains sufficient urea to form during said heating step an amount of ammonia sufficient to raise the final pH to at least about 5.0.

3. A process as defined in claim 1 wherein sufficient ammonia is added to said aqueous solution, prior to said heating step, to raise the pH thereof to between about 1.8 and 5.0, but below the pH at which gelation begins.

4. A process for the manufacture of aluminum hydroxy-phosphate xerogels of high surface area and high surface acidity, which comprises forming a water solution of (1) an aluminum salt selected from the class consisting of aluminum chloride and aluminum nitrate, and (2) a proportion of phosphoric acid sufficient to provide between about 0.02 and 0.9 mole of phosphate ion per mole of aluminum salt; adding ammonia to the resulting solution until the pH is increased substantially, but not beyond the point of incipient gelation; dissolving in the solution sufficient urea to yield an ammonia equivalent sufficient to raise the final pH of the solution to at least about 5.0; heating the resulting solution at a temperature sufficiently high to effect decomposition of said urea with resultant liberation of ammonia, thereby precipitating an aluminum hydroxy-phosphate hydrogel; treating said hydrogel to remove contaminating salt, and drying the same to form a xerogel.

References Cited in the file of this patent
UNITED STATES PATENTS

| | | |
|---|---|---|
| 2,338,089 | Bond | Jan. 4, 1944 |
| 2,898,306 | Cramer et al. | Aug. 4, 1959 |
| 2,938,874 | Rosinki | May 31, 1960 |